(12) United States Patent
Hossain

(10) Patent No.: US 11,236,723 B2
(45) Date of Patent: Feb. 1, 2022

(54) INTEGRATED VERTICAL AXIS WIND POWER GENERATION SYSTEM

(71) Applicant: WiSys Technology Foundation, Inc., Madison, WI (US)

(72) Inventor: Md Maruf Hossain, Green Bay, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 0 days.

(21) Appl. No.: 16/628,131

(22) PCT Filed: Jul. 2, 2018

(86) PCT No.: PCT/US2018/040591
§ 371 (c)(1),
(2) Date: Jan. 2, 2020

(87) PCT Pub. No.: WO2019/010125
PCT Pub. Date: Jan. 10, 2019

(65) Prior Publication Data
US 2020/0217297 A1  Jul. 9, 2020

Related U.S. Application Data

(60) Provisional application No. 62/528,213, filed on Jul. 3, 2017.

(51) Int. Cl.
*F03D 3/00* (2006.01)
*F03D 9/25* (2016.01)
*F03D 15/00* (2016.01)
*F03D 3/02* (2006.01)

(52) U.S. Cl.
CPC ............... *F03D 3/005* (2013.01); *F03D 3/02* (2013.01); *F03D 9/25* (2016.05); *F03D 15/00* (2016.05); *F05B 2240/212* (2013.01)

(58) Field of Classification Search
CPC . F03D 3/005; F03D 9/25; F03D 15/00; F03D 3/02; F05B 2240/212
See application file for complete search history.

(56) References Cited

U.S. PATENT DOCUMENTS

| 5,375,324 | A | 12/1994 | Wallace et al. | |
|---|---|---|---|---|
| 8,541,897 | B2 * | 9/2013 | Khoshnevis | F03D 3/02 290/44 |
| 9,599,092 | B2 | 3/2017 | Hossain et al. | |
| 2006/0151664 | A1 * | 7/2006 | Yu | F03D 9/32 244/4 R |
| 2009/0048051 | A1 * | 2/2009 | Koleoglou | F03D 9/25 475/183 |

(Continued)

*Primary Examiner* — Viet P Nguyen
(74) *Attorney, Agent, or Firm* — Boyle Fredrickson S.C.

(57) ABSTRACT

The present invention provides a system of wind turbines connected to a single unit electric generator to produce electrical power whereby the wind turbine blades rotate coaxially with a main rotor shaft instead of perpendicular to the shaft axis. In this respect, the wind turbine rotor can face the wind from any direction and does not need to be pointed into the wind to be effective, thus, eliminating the need for a yaw system. Moreover, translation of mechanical to torque of the main rotor drive allows the drive components such as the gearbox and generator to be placed near the ground of each wind turbine improving accessibility for maintenance.

14 Claims, 3 Drawing Sheets

(56) References Cited

U.S. PATENT DOCUMENTS

| | | | |
|---|---|---|---|
| 2010/0109336 A1* | 5/2010 | Lee | F03D 80/70 |
| | | | 290/55 |
| 2011/0049905 A1 | 3/2011 | Khoshnevis | |
| 2013/0129509 A1 | 5/2013 | Manning | |
| 2014/0077505 A1* | 3/2014 | Ishimine | F03D 1/02 |
| | | | 290/55 |
| 2016/0025072 A1* | 1/2016 | Monteiro De Barros | |
| | | | F03D 9/257 |
| | | | 415/121.3 |

* cited by examiner

INTEGRATED VERTICAL AXIS WIND POWER GENERATION SYSTEM

CROSS REFERENCE TO RELATED APPLICATION

This application claims the benefit of U.S. provisional application No. 62/528,213, filed Jul. 3, 2017.

BACKGROUND OF THE INVENTION

The present invention relates to the generation of wind energy or wind power through multiple interconnected wind turbines.

Wind energy or wind power refers to the process by which the wind is used to generate mechanical power or electricity. Wind turbines convert the kinetic energy of the wind into mechanical power and that mechanical power is used to generate electricity. The generation of electricity by wind turbines is dependent on the strength of the wind at any given moment.

Wind farm sites are chosen after careful analysis to determine the pattern of the wind regime, including its relative strength and direction at different times of the day and year. Particular areas provide different levels of wind speed, and wind turbines are typically classified by the level of wind speed they are designed for. Small wind turbines may be designed to work at low wind speeds. Typically, small wind turbines in low wind speed areas have been underutilized.

In a conventional wind turbine, a high tower is supported below by a solid foundation fixed into the ground. The tower supports a rotor with rotating blades and a nacelle (or turbine housing) containing drive components, for example, a gearbox, generator, power electronic devices, and yaw mechanism.

U.S. Pat. No. 9,599,092 granted to the present inventor, and which is incorporated herein by specific reference for all purposes, shows a system for generating wind energy through multiple smaller wind turbines mechanically connected to each other and to a single generator. The system of multiple smaller wind turbines are connected to each other and to the single generator through a gear and chain system minimizing the number of mechanical transmissions needed between the wind turbine blades and the single generator.

Typically, a yaw drive insures that the wind turbine blades keep the rotor facing into the wind as the wind direction changes, maximizing the amount of energy produced. A yaw system may provide rotation between the nacelle and the tower (i.e., a yaw bearing) and a means to vary the orientation of the nacelle with respect to the tower (i.e., a yaw drive) using a yaw break and a control system. However, the gear and chain system of U.S. Pat. No. 9,599,092 eliminates the ability of the wind turbine blades or nacelle to rotate with respect to the tower and turn into the wind without interfering with the gear and chain system. This results in a less than optimal amount of energy from the wind translated to the wind turbine rotor and therefore the generator.

SUMMARY OF THE INVENTION

The present invention provides a system of wind turbines connected to a single unit electric generator to produce electrical power whereby the wind turbine blades rotate parallel to or coaxially with a main rotor shaft instead of perpendicular to the shaft axis. In this respect, the wind turbine rotor can face the wind from any direction and does not need to be pointed into the wind to be effective, thus, eliminating the need for a yaw system. Moreover, translation of mechanical to torque of the main rotor drive allows the drive components such as the gearbox and generator to be placed near the ground of each wind turbine improving accessibility for maintenance.

A vertical axis wind turbine (VAWT) provides a main rotor shaft which is transverse to the wind, usually arranged vertically, where the wind turbine blades rotate parallel to or coaxially with the main rotor shaft instead of perpendicular to the shaft axis as is found in a horizontal axes wind turbine (HAWT). The arrangement of the VAWTs allows the tower to support the rotor and rotating blade while the main drive shaft can be coupled to a lower end of the tower above or below ground. A gearbox may be placed between the tower and the main drive shaft. The main drive shaft will be connected to the electric generator optionally with the help of a gearbox for fixed speed generator systems or variable speed generator systems.

In one embodiment of the present invention, a wind turbine system comprising two or more wind turbines arranged in an array, each comprising a rotor shaft extending along a vertical axis and supporting rotation of rotor blades about the vertical axis, and a base supporting the rotor shaft extending above a ground; and a mechanical coupling connecting the rotor shafts of the bases of the two or more wind turbines to each other to further transmit rotation of the rotor blades to a common drive shaft.

It is thus a feature of one embodiment of the present invention to eliminate the gearbox, electric generator, power electronic devices, and yaw mechanisms at the top of every wind turbine tower, thereby reducing the total weight carried by the tower and the number of electrical components.

The rotor blades may be adapted to be driven by wind in a direction transverse to the rotor shaft.

It is thus a feature of one embodiment of the present invention to translate the torque of the rotor shaft downward to the ground where torque from multiple turbines can be combined more easily.

The rotor blades may be adapted to be driven by wind below the cut-in wind speed (typically about 4 m/s or 9 mph).

It is thus a feature of one embodiment of the present invention to capture energy from low or slower wind areas.

The rotor blades may provide airfoil surfaces extending radially outward from an upper end of the rotor shaft and then downward therefrom to return and attach to a lower end of the rotor shaft to extract wind energy from horizontally directed winds at a range of angles about the vertical axis.

It is thus a feature of one embodiment of the present invention to accommodate wind in different directions.

At least one of the two or more wind turbines may be a Darrieus turbine. The two or more wind turbines may also be Savonius, Darrieus, giromill, helical, etc.

It is thus a feature of one embodiment of the present invention that a combination of types of vertical axis wind turbines may be used in the present system.

An electrical generator may be mechanically connected to the common drive shaft and adapted to collect energy produced by rotation of the rotor blades of the two or more wind turbines. The electrical generator may be adapted to convert the energy collected from the rotation of the rotor blades of the two or more wind turbines to electrical energy.

It is thus a feature of one embodiment of the present invention to reduce the number of generators and power electronic interfaces and systems, thereby reducing overall construction, installation and maintenance costs.

The common drive shaft may include multiple portions extending between each pair of bases.

It is thus a feature of one embodiment of the present invention to provide a single connecting driveshaft rather than separate driveshafts that come together at a single point.

The mechanical coupling may comprise a right angle gear drive communicating between the rotor shaft and a horizontal common drive shaft.

It is thus a feature of one embodiment of the present invention to eliminate a conventional gearbox and simplifying the gear mechanisms to preserve translation of forces.

The mechanical coupling may comprise at least one gear configured to translate a slower rotation speed of the rotor shaft to a faster rotation speed of the common drive shaft.

It is thus a feature of one embodiment of the present invention to allow each turbine connected to the system to rotate at variable speeds while still allowing capture of the turbines' energy to a single electric generator.

The common drive shaft may be oriented along a horizontal axis substantially parallel to and in close proximity to the ground.

It is thus a feature of one embodiment of the present invention to position the base, common drive shaft and generator near or below the ground making maintenance and repair substantially easier.

The common drive shaft may be underground. The common drive shaft may be protected within a tube.

It is thus a feature of one embodiment of the present invention to interconnect the network of wind turbines near or below the ground so that the linkage is not exposed to the environment.

Rotation of rotor blades about the vertical axis of the two or more wind turbines may be at different speeds.

It is thus a feature of one embodiment of the present invention to allow for wind turbines to be at different areas on a wind farm receiving different amounts of wind, yet their energy is combined to a common generator.

The two or more wind turbines may be arranged in series along the common drive shaft such that transmission of the rotation of the rotor blades is along a same path.

It is thus a feature of one embodiment of the present invention to reduce the number of mechanical transmissions of the system resulting in energy loss.

Horizontally extending struts may extend between the rotor shaft and the rotor blades for support.

In one embodiment of the present invention, a method of generating energy is provided, comprising arranging two or more wind turbines in an array, each comprising a rotor shaft extending along a vertical axis and supporting rotation of rotor blades about the vertical axis, and a base supporting the rotor shaft above the ground; mechanically coupling the bases of the two or more wind turbines to each other to further translate rotation of the rotor blades to a common drive shaft; and mechanically connecting an electrical generator to the common drive shaft wherein energy generated by each wind turbine is accumulated by the electrical generator.

These particular objects and advantages may apply to only some embodiments falling within the claims and thus do not define the scope of the invention.

DETAILED DESCRIPTION OF THE PREFERRED EMBODIMENT

Figure 1:
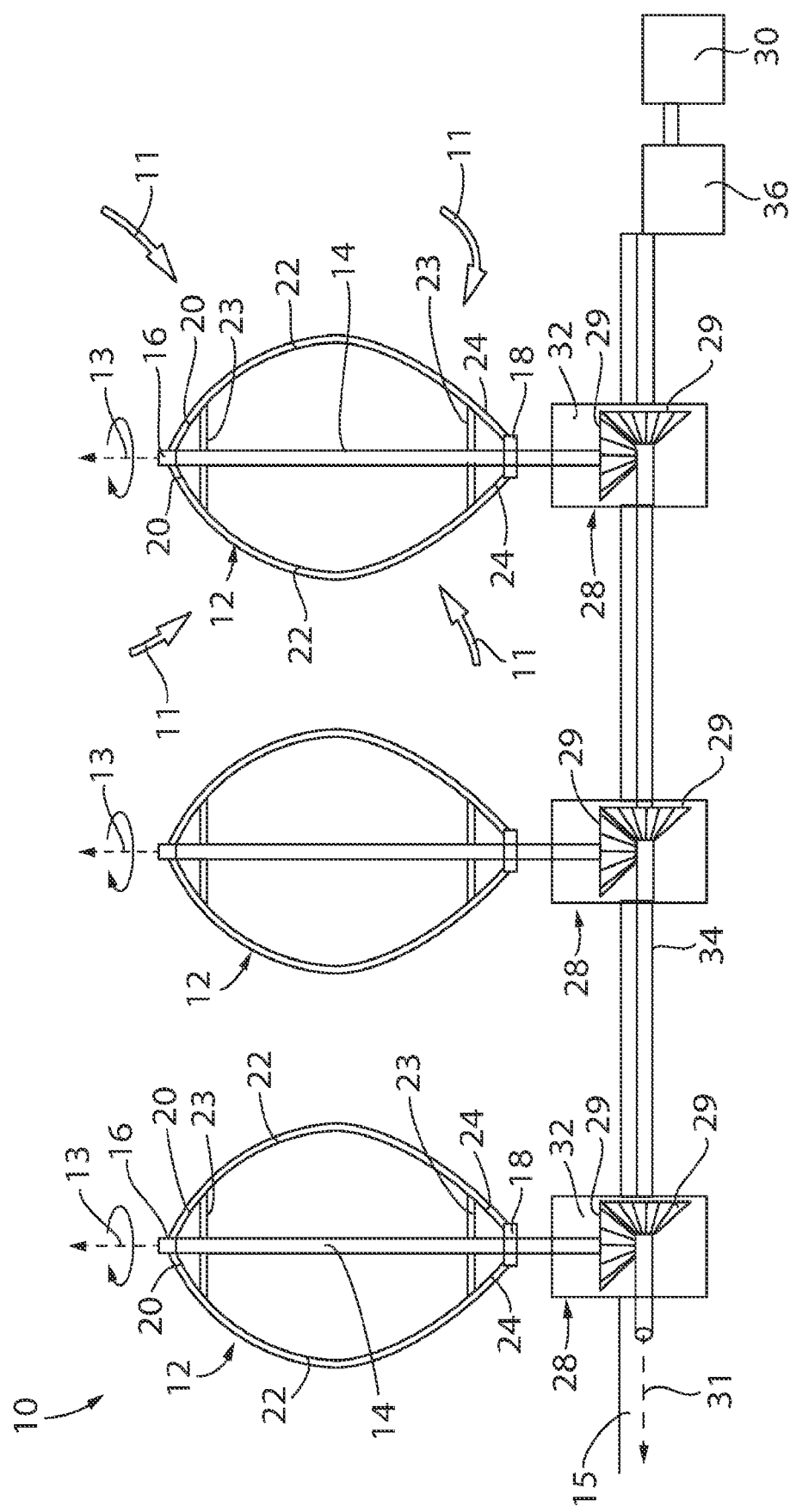
FIG. 1 is a perspective view of multiple vertical axis turbines connected to each other and to a single generator in accordance with an embodiment of the present invention.

Referring now to FIG. 1, in one embodiment of the present invention, a wind energy generation system 10 may include at least two wind turbines 12 interconnected to form an array of turbines 12 forming the wind energy generation system 10. For example, in the embodiment shown, three turbines form the wind energy generation system 10, although the present system can work with any number of turbines 12, and some advantages can be achieved even with a single wind turbine 12.

The wind turbines 12 may be vertical axis wind turbines (VAWTs) defined by a substantially vertical axis 13 of rotation whereby the axis of rotation is transverse to the wind 11 and may be vertical with respect to a ground 15. The wind turbines 12 may comprise a base 28 supporting a "tower" or main rotor shaft 14 extending upwardly from the base 28 above the ground 15. The base 28 may be supported by a concrete slab foundation installed above or below the ground 15. It is understood that the ground 15 may include installations in on-shore and off-shore locations.

Each wind turbine 12 comprises a number of rotor blades 22 attached at an upper hub 16 and a lower hub 18 of the main rotor shaft 14. The upper hub 16 attaches to upper ends 20 of the rotor blades 22 while the lower hub 18 attaches to lower ends 24 of the rotor blades 22. The rotor blades 22 may take a bowed out configuration resembling the bow of a bow and arrow and are typically made of aluminum, fiber glass, or carbon fiber. The rotor blades 22 of the wind turbines may provide an airfoil-shaped body or surfaces extending radially outward from the upper hub 16 of the rotor shaft 14 and then downward therefrom to return and be attached to the lower hub 18 of the rotor shaft 14 to extract wind energy from horizontally directed winds 11 at a range of angles about the vertical axis 13.

While the embodiment shown in FIG. 1 has two rotor blades 22 it is contemplated that the turbine 12 may have any number of rotor blades 22 providing torque to the main rotor shaft 14. The rotor blades 22 may be further supported by horizontal struts 23 extending between the main rotor shaft 14 and the rotor blades 22 to provide additional support.

The rotor blades 22 may further include a breaking system such as an aerodynamic, mechanical or electrical break which protects the rotor blades 22 from over speeding while keeping the speeds of the turbines at more consistent speeds. For example, shutters attached to the rotor blades 22 may automatically deploy when the rotor blades 22 gather too much speed to provide further resistance to the wind 11.

It is understood that the wind turbines 12 may be any combination of various types of VAWTs known in the art, such as Savonius, Darrieus, giromill, helical, etc. For example, Darrieus type wind turbines 12 are shown in FIG. 1. The rotor blades 22 of the wind turbines 12 may be curved or straight, and may be scooped to catch wind 11.

The wind turbines 12 may be of smaller size such that the rotor blades 22 are shorter but will still rotate at lower wind speeds, such as at or below approximately 4 m/s or 9 mph.

As the wind hits the rotor blades 22, the rotor blades 22 rotate about the substantially vertical axis 13 of the main rotor shaft 14 thereby causing the main rotor shaft 14 to also rotate about the substantially vertical axis 13. This torque is translated to the base 28 of the wind turbine 12 that supports the main rotor shaft 14 and houses the equipment used to translate the torque to an electrical generator 30.

The base 28 may include various drive components below the main rotor shaft 14 and is generally in close proximity to the ground 15 or may be positioned below the ground 15 (buried underground). Generally, torque from the rotation of the main rotor shaft 14 is translated to the electrical generator 30 through drive components including, for example, a first gearbox 32 of the base 28, a common drive shaft 34, and a second gearbox 36 as further explained below. The shafts of the drive components may be supported by bearings, for example, supported in ball bearings and the like.

The base 28 of the main rotor shaft 14 may include the first gearbox 32 including a number of gears 29 (e.g., bevel and differential gears) receiving the torque of the main rotor shaft 14 and translating the torque of the main rotor shaft 14 to the common drive shaft 34 extending perpendicular to the main rotor shaft 14 along a horizontal axis 31. For example, a right angle gear drive or bevel gears 29 may be used to transmit torque of shafts that are 90 degrees apart or at other different angles apart, or to transmit torque of shafts at different rotational speeds to a common rotational speed. In another example, the gears 29 may comprise a differential or gear train allowing the main rotor shafts 14 of the different wind turbines 12 to rotate at different speeds while outputting a torque of the common drive shaft 34 that is an approximate sum or multiple of the speeds of each common drive shaft 34 or average speed of all the common drive shafts 34. Among the types of gears that may be used include planetary, helical, parallel shaft, spur and worm types, and the like. Two or more gear types may be combined in multiple stages. The gears are typically manufactured of aluminum alloys, stainless steel, and cast iron.

In an alternative embodiment, the torque of the main rotor shaft 14 may be translated directly to the common drive shaft 34 directly the use of the first gearbox 32 such as in a direct-drive wind turbine.

As seen in FIG. 1, the main rotor shafts 14 of the at least two turbines 12 may be coupled to the same common drive shaft 34 via the base 28 and/or the first gearbox 32. In this respect, the common drive shaft 34 may capture wind energy from multiple turbines 12 at the same time. Any number and arrangement of turbines 12 may be coupled to the common drive shaft 34, and it is contemplated that the common drive shaft 34 may take any configuration and may be composed of multiple interconnected drive shafts.

The common drive shaft 34 may be protected from the environment by being installed within a tube and/or may be positioned above ground or buried underground.

It is understood that the common drive shaft 34 may be variable speed drive or fixed speed drive. The common drive shaft 34 may incorporate one or more universal joints, jaw couplings, or rag joints, and sometimes a splined joint or prismatic joint. It is also understood that the drive shaft 34 may be replaced with any mechanical component for transmitting torque and rotation, or used to connect components of a drive train. For example, using sprockets, chain wheels, cranks, or pulleys as well.

The electrical generator 30 is similarly mechanically linked to the common drive shaft 34. Usually the rotational speed of the wind turbine is slower than the equivalent rotation speed of the electrical network (typical rotation speeds for wind generators are 5-20 rpm while a directly connected machine will have an electrical speed between 750-3600 rpm). Therefore, the second gearbox 36 may be inserted between the common drive shaft 34 and the electrical generator 30 as further described below.

The common drive shaft 34 may be coupled to the second gearbox 36 which translates, for example, the slowly rotating, high torque power of the drive shaft 34 to high-speed, low torque power used by the common electrical generator 30. The second gearbox 36 may also include a number of gears (such as bevel and differential gears) receiving the torque of the common drive shaft 34 and translating the torque to the electrical generator 30 as similarly described above with first gearbox 32. Among the types of gears that may be used include planetary, helical, parallel shaft, spur and worm types. Two or more gear types may be combined in multiple stages. The gears are typically manufactured of aluminum alloys, stainless steel and cast iron.

In an alternative embodiment, the common electrical generator 30 may be driven directly from the common drive shaft 34 omitting the second gearbox 36 such as in a direct drive wind turbine. In some embodiments, the common electrical generator 30 may be placed in series with the common drive shaft 34 and positioned between the connection point of adjacent turbines 12 (instead of at the end of the common drive shaft 34). By placing the generator 30 between the connection point of adjacent turbines, the amount of torque on the common drive shaft 34 is reduced, allowing a weight of the drive shaft 34 to be reduced.

It is understood that the electrical generator 30 may be a variable speed or fixed speed generator converting the kinetic energy of the wind 11 into mechanical energy of the multiple turbines 12 into electrical energy, and then translating the electrical energy to a utility grid to be stored and/or used by users.

Figure 2:
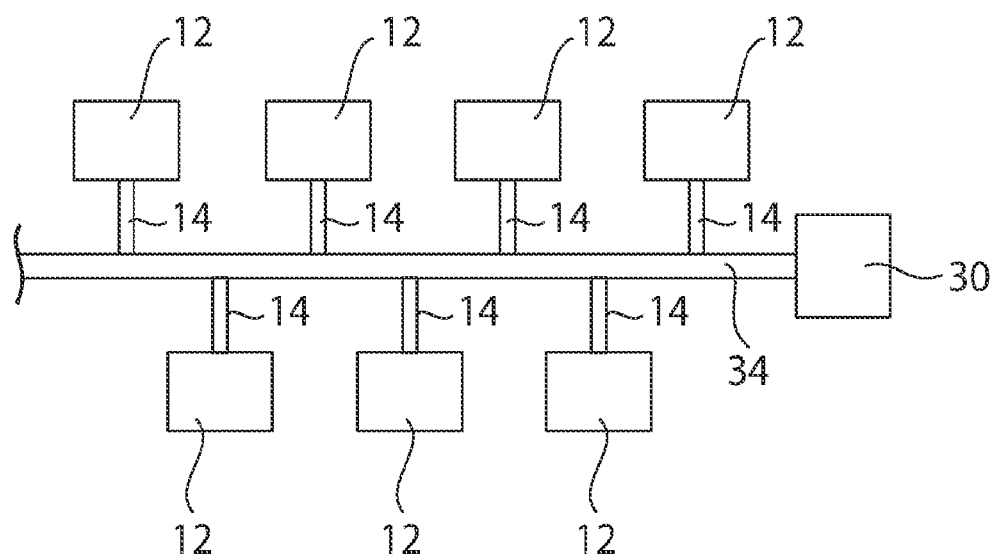
FIG. 2 is a schematic representation of the multiple vertical axis turbines arranged in an array.
Figure 3:
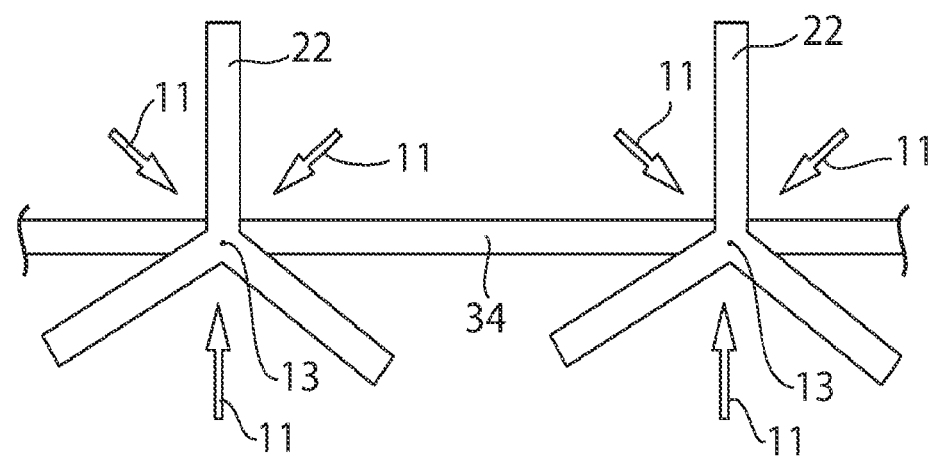
FIG. 3 is a top plan schematic view of the blades of the multiple vertical axis turbines and common drive shaft connecting the multiple vertical axis turbines to one another.
Figure 4:
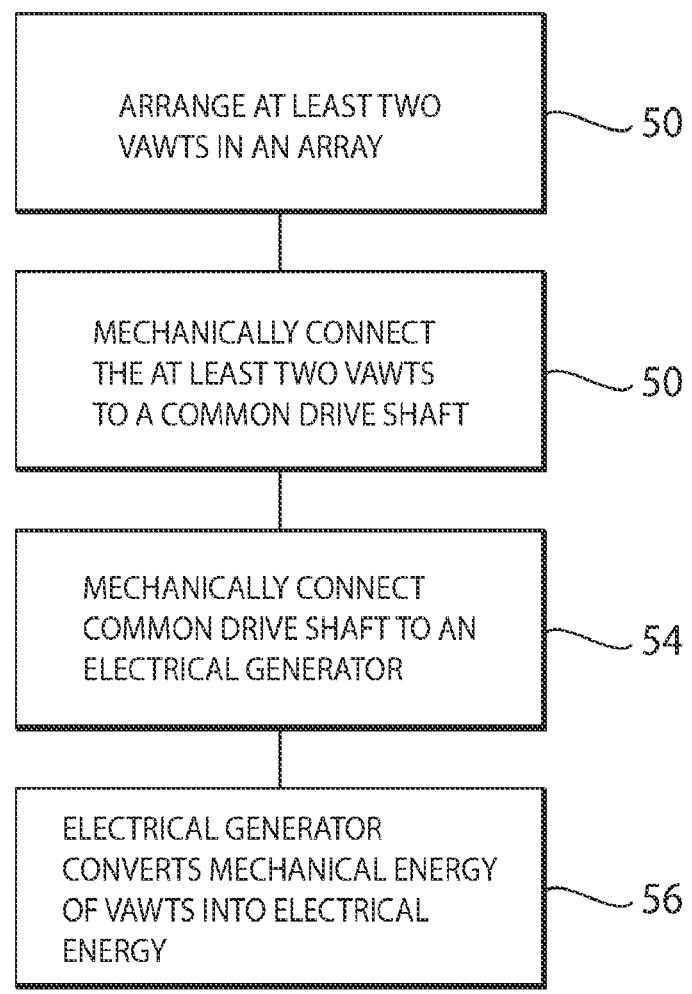
FIG. 4 is a flowchart showing the principal steps for operation of the system of multiple vertical axis turbines shown in FIG. 1.

Referring to FIGS. 2 through 4, in operation, multiple wind turbines 12 are installed and arranged in an array, such as in series (such that transmission of the rotation of the rotor blades is along a same path), in parallel (such that transmission of the rotation of the rotor blades is along different paths), or multiple numbers of rows (whereby the paths are combined), an exemplary arrangement shown in FIG. 2, and as indicated by process block 50. The VAWTs are not restricted to a certain orientation or arrangement of the wind turbines 12 and/or rotor blades 22 with respect to each other since the wind 11 may hit the rotor blades 22 at many different angles, as shown in FIG. 3.

The main rotor shaft 14 of each wind turbine 12 in the given wind energy generation system 10 may be mechanically interconnected with an adjacent wind turbine 12, as indicated by process block 52. For example, the main rotor shaft 14 may be connected to the first gearbox 32 of the base 28 which is mechanically connected to the common drive shaft 34. In this respect, the proximity of each wind turbine 12 in a given wind energy generation system 10 may allow for mechanical interconnection of each wind turbine 12 to each other.

The common drive shaft 34 may be connected to the second gearbox 36, and then to the single electrical generator 30 of the given wind energy generation system 10 to collect the energy from each wind turbines 12 of the given wind energy generation system 10, as indicated by process block 54. A wind farm may have only a single electrical generator 30 with multiple turbines 12.

The rotor blades 22 of the wind turbines 12 may be rotated about the substantially vertical axis 13 by wind 11 coming from any direction to provide torque to the main rotor shaft 14. The wind 11 may be at relatively low wind speeds of at or below approximately 4 m/s or 9 mph thus utilizing regions with lower wind speeds. The torque of the main rotor shaft 14 is translated to the first gearbox 32 (optionally), then to the common drive shaft 34, then to the second gearbox 36 (optionally), and finally to the common electrical generator 30.

The mechanical energy from the turbines 12 is converted to electrical energy by the electrical generator 30, which is then used by the electrical generator 30 to transmit to the utility grid for power consumption, as indicated by process block 56.

Besides electricity generation, accumulated wind power at the drive shaft 34 may also be used for water pumping, grinding grain, etc. in a broader scale. In that case, electrical generator 30 will be replaced by the appropriate apparatus. For example, for water pumping, the electric generator will be replaced by a single water pump.

In one embodiment, a variable speed electrical generator 30 may be a DFIG (doubly fed induction generator) or an FRC (fully rated converter). The voltage generated by a variable speed wind turbine may not be non-grid compliant. Therefore, in order to supply the transmission network with power from these turbines, the signal may be passed through a power converter, which ensures that the frequency of the voltage of the electricity being generated by the wind turbine is the same frequency of the transmission system when it is transferred onto the transmission system. Power converters may first convert the signal to direct current (DC), and then convert the DC signal to an alternating current (AC) signal. Techniques used to convert the signal include pulse width modulation and the like known in the art. In another embodiment, a fixed speed electrical generator may be used, such as a synchronous generator or an induction generator.

It is understood that the size and scale of the above described invention may be reduced to allow the system to be more easily moveable or portable. For example, a portable version may be used by the military or for tactical purposes.

It is also understood that the above described invention may be installed in various environments including underwater, on mountains, and above buildings. For example, the turbines 12 may be installed on the roof tops of buildings, for example, in urban environments.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What I claim is:

1. A wind turbine system comprising:
   two or more wind turbines arranged in series along a horizontal axis extending along a ground, each wind turbine comprising a rotor shaft extending along a vertical axis perpendicular to the horizontal axis, rotor blades supported by the rotor shaft and configured to rotate about the vertical axis, and a base positioned below the rotor shaft and supporting the rotor shaft above the ground independent of the other wind turbines;
   a mechanical coupling including at least one gear connecting the rotor shafts of the two or more wind turbines to each other to further transmit rotation of the rotor shafts;
   a common drive shaft extending between the rotor shafts of the two or more wind turbines along the horizontal axis and receiving a combined rotation of the rotor shafts; and
   a tube extending along the horizontal axis and supporting lateral extension of the common drive shaft within the tube, the tube communicating with the ground at multiple points along the horizontal axis;
   wherein the tube is positioned at least partially underground; and
   wherein the ground absorbs vibrational forces of the common drive shaft along a length of the tube.

2. The system of claim 1 wherein the rotor blades are adapted to be driven by wind in a direction transverse to the rotor shaft.

3. The system of claim 2 wherein the rotor blades are adapted to be driven by wind below 4 m/s or 9 mph.

4. The system of claim 1 wherein the rotor blades provide airfoil surfaces extending radially outward from an upper end of the rotor shaft and then downward therefrom to return and attach to a lower end of the rotor shaft to extract wind energy from horizontally directed winds at a range of angles about the vertical axis.

5. The system of claim 4 wherein at least one of the two or more wind turbines is a Darrieus turbine.

6. The system of claim 1 further comprising an electrical generator mechanically connected to the common drive shaft and adapted to collect energy produced by rotation of the rotor blades of the two or more wind turbines.

7. The system of claim 6 wherein the electrical generator is adapted to convert energy collected from the rotation of the rotor blades of the two or more wind turbines to electrical energy.

8. The system of claim 1 wherein the common drive shaft includes multiple portions extending between each pair of bases.

9. The system of claim 1 wherein the mechanical coupling comprises a right angle gear drive communicating between the rotor shaft and a horizontal common drive shaft.

10. The system of claim 1 the mechanical coupling comprises at least one gear configured to translate a slower rotation speed of the rotor shaft to a faster rotation speed of the common drive shaft.

11. The system of claim 1 further comprising horizontally extending struts extending between the rotor shaft and the rotor blades for support.

12. The system of claim 1 wherein the two or more wind turbines may be arranged in series along the common drive shaft such that transmission of the rotation of the rotor blades is along a same path.

13. The system of claim 1 wherein rotation of rotor blades about the vertical axis of the two or more wind turbines are at different speeds.

14. A method of generating energy, comprising:
arranging two or more wind turbines in series along a horizontal axis extending along a ground, each wind turbine comprising a rotor shaft extending along a vertical axis perpendicular to the horizontal axis, rotor blades supported by the rotor shaft and configured to rotate about the vertical axis, and a base positioned below the rotor shaft and supporting the rotor shaft above the ground;
mechanically coupling by at least one gear the rotor shafts of the two or more wind turbines to each other to further translate rotation of the rotor shafts to a common drive shaft extending between the rotor shafts of the two or more wind turbines along the horizontal axis and receiving a combined rotation of the rotor shafts, the common drive shaft housed within a tube extending along the horizontal axis and extending laterally within the tube, the tube communicating with the ground at multiple points along the horizontal axis, wherein the tube is positioned at least partially underground, and wherein the ground absorbs vibrational forces of the common drive shaft along a length of the tube; and
mechanically connecting an electrical generator to the common drive shaft wherein energy generated by each wind turbine is accumulated by an electrical generator.

* * * * *